(12) United States Patent
Nickerson et al.

(10) Patent No.: US 7,970,887 B2
(45) Date of Patent: *Jun. 28, 2011

(54) MEASURING A PAGE-SPECIFIC SUBJECTIVE USER REACTION CONCERNING EACH OF MULTIPLE WEB PAGES OF A WEBSITE

(75) Inventors: Rand B. Nickerson, Highland Park, IL (US); Mark A. Treschl, Highland Park, IL (US); Kathryn L. Kidd, Rockville, MD (US); Matthew J. Crofoot, Chicago, IL (US)

(73) Assignee: OpinionLab, Inc., Highland Park, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 10/136,919

(22) Filed: May 1, 2002

(65) Prior Publication Data

US 2003/0009555 A1 Jan. 9, 2003

Related U.S. Application Data

(63) Continuation of application No. 09/385,256, filed on Aug. 30, 1999, now Pat. No. 6,421,724.

(51) Int. Cl.
*G06F 15/173* (2006.01)
*G06Q 30/00* (2006.01)
(52) U.S. Cl. ...................... 709/224; 705/14.41
(58) Field of Classification Search .............. 709/217, 709/218, 224; 714/47, 33; 705/14, 10, 14.41; 395/161, 155, 159; 707/3
See application file for complete search history.

(56) References Cited

U.S. PATENT DOCUMENTS

| | | | | |
|---|---|---|---|---|
| 5,537,618 A | * | 7/1996 | Boulton et al. | 715/745 |
| 5,678,041 A | | 10/1997 | Baker et al. | 395/609 |
| 5,706,507 A | | 1/1998 | Schloss | 395/615 |
| 5,727,950 A | | 3/1998 | Cook et al. | 434/350 |

(Continued)

FOREIGN PATENT DOCUMENTS

WO WO 00/62204 10/2000

(Continued)

OTHER PUBLICATIONS

Morgan, Bryan, "Visual J++ Unleashed," Online!, SAMS.NET, Indianapolis, IND., XP022333000, Chapter 25 Browser Support for Active Content, Jun. 21, 2005.

(Continued)

*Primary Examiner* — Patrice L Winder
*Assistant Examiner* — Asghar Bilgrami
(74) *Attorney, Agent, or Firm* — Baker Botts L.L.P.

(57) ABSTRACT

A system for measuring user feedback concerning a particular web page of a website includes a first icon. The first icon is viewable on the particular web page independent of input from a user subsequent to the user accessing the particular web page. The first icon solicits user feedback concerning the particular web page as a whole from the user independent of input from the user subsequent to the user accessing the particular web page. The first icon receives user input indicating a desire to provide user feedback concerning the particular web page as a whole, and the user input causes a second icon to become viewable on the particular web page for providing the user feedback concerning the particular web page as a whole. Software associated with the second icon receives the user feedback concerning the particular web page as a whole for reporting to a website owner.

30 Claims, 6 Drawing Sheets

U.S. PATENT DOCUMENTS

| | | | |
|---|---|---|---|
| 5,754,939 A | 5/1998 | Herz et al. | 455/4.2 |
| 5,761,683 A | 6/1998 | Logan et al. | 707/513 |
| 5,778,182 A | 7/1998 | Cathey et al. | 395/200.49 |
| 5,804,803 A | 9/1998 | Cragun et al. | 235/375 |
| 5,809,247 A * | 9/1998 | Richardson et al. | 709/218 |
| 5,862,223 A | 1/1999 | Walker et al. | 380/25 |
| 5,862,260 A | 1/1999 | Rhoads | 382/232 |
| 5,862,325 A | 1/1999 | Reed et al. | 395/200.31 |
| 5,870,744 A | 2/1999 | Sprague | 707/9 |
| 5,958,008 A | 9/1999 | Pogrebisky et al. | 709/223 |
| 5,974,572 A * | 10/1999 | Weinberg et al. | 714/47 |
| 5,991,735 A | 11/1999 | Gerace | 705/10 |
| 6,029,171 A | 2/2000 | Smiga et al. | 707/102 |
| 6,035,330 A | 3/2000 | Astiz et al. | 709/208 |
| 6,134,531 A | 10/2000 | Trewitt et al. | 705/10 |
| 6,141,010 A | 10/2000 | Hoyle | 345/356 |
| 6,161,112 A | 12/2000 | Cragun et al. | 707/501 |
| 6,189,029 B1 * | 2/2001 | Fuerst | 709/217 |
| 6,236,975 B1 | 5/2001 | Boe et al. | 705/7 |
| 6,260,064 B1 | 7/2001 | Kurzrok | 709/224 |
| 6,389,538 B1 | 5/2002 | Gruse et al. | 713/194 |
| 6,421,724 B1 | 7/2002 | Nickerson et al. | 709/224 |
| 6,434,556 B1 | 8/2002 | Levin et al. | 707/5 |
| 6,449,632 B1 | 9/2002 | David et al. | 709/202 |
| 6,477,504 B1 | 11/2002 | Hamlin et al. | 705/10 |
| 6,480,852 B1 | 11/2002 | Himmel et al. | 707/10 |
| 6,510,427 B1 | 1/2003 | Bossemeyer, Jr. et al. | 707/6 |
| 6,578,014 B1 | 6/2003 | Murcko, Jr. | 705/26 |
| 6,606,659 B1 | 8/2003 | Hegli et al. | 709/225 |
| 6,631,184 B1 | 10/2003 | Weiner | 379/92.01 |
| 6,681,247 B1 | 1/2004 | Payton | 709/217 |
| 6,772,139 B1 * | 8/2004 | Smith, III | 707/3 |
| 6,859,784 B1 | 2/2005 | van Duyne et al. | 705/10 |
| 6,895,437 B1 | 5/2005 | Cowdrey et al. | 709/224 |
| 2002/0049713 A1 | 4/2002 | Khemlani et al. | 707/1 |
| 2002/0065802 A1 | 5/2002 | Uchiyama | 714/124 |
| 2002/0072955 A1 | 6/2002 | Brock | 705/10 |
| 2002/0087526 A1 | 7/2002 | Rao | 707/1 |
| 2002/0087969 A1 | 7/2002 | Brunheroto et al. | 725/13 |
| 2002/0099617 A1 | 7/2002 | Fogelson | 705/26 |
| 2002/0111865 A1 * | 8/2002 | Middleton et al. | 705/14 |
| 2003/0207238 A1 | 11/2003 | Latzina et al. | 434/118 |

FOREIGN PATENT DOCUMENTS

WO  WO 2004/012044  2/2004

OTHER PUBLICATIONS

Faison, Ted, "Component-Based Development with Visual C#," Online!, XP002333001, Chapter 8, Creating Front Ends with the WebBrowser Component, pp. 1-4, 27, 33, Feb. 2002.

Etgen, Michael et al., "What Does Getting WET (Web Event-Logging Tool) Mean for Web Usability?," Proceedings of the 5th Conference on Human Factors & The Web, XP002332999, Jun. 3, 1999.

PCT, Notification of Transmittal of International Preliminary Examination Report, 5 pages, Aug. 22, 2002.

BizRate.com, Independent Merchant Evaluation, https://eval.bizrate.com/popchoice.pl?id=19383&rb=1&ip=204.194.27.2&xsum=67748, 1 page https://eval.bizrate.com/eval_t.pl?id=19383&ip=204.194.27.2&xsum=67748&g=102, 5 pages, printed Jun. 13, 2000.

Unknown, "Different Versions of the OnlineOpinion Data Collection Technique Dramatically Impact the Type of Response a Website Receives," OpinionLab, Inc., White Paper, 5 pages, © 2001.

Nickerson, et al., "Method of Incorporating User Reaction Measurement Software into Particular Web Pages of a Website," U.S. Appl. No. 09/595,337, filed Jun. 14, 2000.

Nickerson, et al., "System and Method for Reporting to a Website Owner User Reactions to Particular Web Pages of a Website," U.S. Appl. No. 09/595,050, filed Jun. 14, 2000.

Nickerson, et al., "System and Method for Measuring and Reporting User Reactions to Particular Web Pages of a Website," U.S. Appl. No. 09/595,141, filed Jun. 14, 2000.

Nickerson, et al., "System and Method for Measuring and Reporting Viewer Reactions to Interactive Content," U.S. Appl. No. 10/285,953, filed Oct. 31, 2002.

Nickerson, et al., "Receiving and Reporting Page-Specific User Feedback concerning One or More Particular Web Pages of a Website," U.S. Appl. No. 10/210,609, filed Jul. 31, 2002.

Nickerson, et al., "Receiving and Reporting Page-Specific User Feedback concerning One or More Particular Web Pages of a Website," U.S. Appl. No. 10/210,256, filed Jul. 31, 2002.

Nickerson, et al., "Receiving and Reporting Page-Specific User Feedback Concerning One or More Particular Web Pages of a Website," U.S. Appl. No. 10/238,215, filed Sep. 9, 2002.

Nickerson, et al., "Receiving and Reporting Page-Specific User Feedback Concerning One or More Particular Web Pages of a Website," U.S. Appl. No. 10/238,191, filed Sep. 9, 2002.

Nickerson, et al., "Collecting a User Response to an Explicit Question Specifically Concerning a Particular Web Page of a Website," U.S. Appl. No. 10/358,064, filed Feb. 3, 2003.

P.R. Vora, "Designing for the Web: A Survey," design/methods & tools, interjections, pp. 13-30, May-Jun. 1998.

P. Katerattanakul, et al., "Measuring Information Quality of Web Sites: Development of an Instrument," from the 20th International Conference on Information Systems, 7 pages, Jan. 1999.

T.S. Tullis, "A Method for Evaluating Web Page Design Concepts," from CHI 98 Conference Summary on Human Factors in Computing Systems, ACM, ISBN 1-58113-028-7, 2 pages, Apr. 1998.

C Shahabi, et al., "Knowledge Discovery from Users Web-Page Navigation," XP010219671 ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29.

J.H. Watt, et al., "Using the Internet for Audience and Customer Research," XP010355892, ISBN: 0-7803-579-09-4, Professional Communication Conference 1999, IPCC 99, Communication Jazz: Improvising the New International Communication Culture, Proceedings 1999, IEEE International New Orleans, LA, USA Sep. 7-10, 1999, Piscataway, NJ, USA, IEEE US, pp. 121-130.

PCT, Notification of Transmittal of the International Search Report or the Declaration, 7 pages, Jan. 8, 2004.

Notification of Transmittal of the International Search Report or the Declaration (PCT Rule 44.1) mailed Sep. 7, 2004 (12 pages) re International Application No. PCT/US 03/23327, Jul. 25, 2003.

* cited by examiner

Make your web space a better place:

User Registration

By registering you will be able to provide more useful feedback to the sites that you visit. Once you complete the following information, a cookie will store an ID with your browser that will identify your unique demographics with the ratings you make on a given page.

You only need to complete the following information once and it will be associated with your ratings. You will use your password to update this information online.

Nickname: [ ]
Password: [ ]
E-mail Address: [ ]
Gender: [select gender ▼]
Age: [select age ▼]
Industry: [select industry ▼]
Employment Status: [select status ▼]

[Register]

Registration Tips

- Please specify a "valid" email address as we will send your password to this email address.
- When selecting your user name, please use only alphanumeric characters. No special characters are accepted, such as <space>, /, -, _, !,~, etc.
- Please do not select a user name that contains words that others may consider to be offensive; no swear words will be permitted.
- You can change your password at any time by selecting Edit Profile from the Help page.

Please read our Privacy Policy for information on how we protect user privacy.

□ Done | Internet zone

FIG. 6

MEASURING A PAGE-SPECIFIC SUBJECTIVE USER REACTION CONCERNING EACH OF MULTIPLE WEB PAGES OF A WEBSITE

CROSS-REFERENCE TO RELATED APPLICATION

This application is a continuation under 35 U.S.C. §120 of U.S. application Ser. No. 09/385,256, filed Aug. 30, 1999 now U.S. Pat. No. 6,421,724, entitled "System and Method for Measuring User Reactions Concerning One or More Particular Web Pages of a Website.

TECHNICAL FIELD OF THE INVENTION

The present invention relates in general to communications and more particularly to measuring a page-specific subjective user reaction concerning each of multiple web pages of a website.

BACKGROUND OF THE INVENTION

Many website owners desire information concerning usage of their websites. For example, an Internet website owner might use a third party service to track the number of users that visit its website, the number of "clicks" these users collectively perform (using their mouse pointers) while visiting the website, and how long these users stay at the website. Using this objective information, the website owner may determine that its website is not attracting a sufficient number of users or has been ineffective at keeping the interest of users once they arrive. The website owner may react accordingly to improve its websites and, possibly, the success of its associated business operations.

Previous techniques for obtaining information concerning usage of websites often do not provide website owners with information about how users subjectively react to their websites, making the information of minimal value. Prior techniques that do solicit subjective user reactions do so with respect to transactions carried out using the website, but not with respect to the website itself. These techniques give website owners little if any information concerning subjective reactions of users to particular pages of their websites. Moreover, website owners are given little if any information about how users experience their websites as the users navigate through them, moving from page to page according to the topography of the websites. Even techniques that request users to provide subjective reactions concerning transactions may be relatively difficult to use, obtrusive, unstandardized, or otherwise deficient in some manner that causes them to be seldom used and therefore ineffective. The information reported to website owners may also be ineffective due to the format in which it is provided, for example, in reports that are difficult to interpret and do not allow useful comparisons to be made. These and other disadvantages make prior techniques inadequate for many website owners.

SUMMARY OF THE INVENTION

According to the present invention, problems and disadvantages associated with previous techniques for receiving user feedback concerning websites have been substantially reduced or eliminated.

In one embodiment of the present invention, a system for measuring user feedback concerning a particular web page of a website includes a first icon. The first icon is viewable on the particular web page independent of input from a user subsequent to the user accessing the particular web page. The first icon solicits user feedback concerning the particular web page as a whole from the user independent of input from the user subsequent to the user accessing the particular web page. The first icon receives user input indicating a desire to provide user feedback concerning the particular web page as a whole, and the user input causes a second icon to become viewable on the particular web page for providing the user feedback concerning the particular web page as a whole. Software associated with the second icon receives the user feedback concerning the particular web page as a whole for reporting to a website owner.

In another embodiment, a system for measuring a page-specific subjective user reaction concerning each of multiple particular web pages of a website includes an icon. The icon is viewable on each of the multiple particular web pages of the website independent of input from a user subsequent to the user accessing the particular web page. The icon solicits a page-specific subjective user reaction to the particular web page as a whole from the user independent of input from the user subsequent to the user accessing the particular web page. The icon appears identically and behaves consistently on each of the particular web pages. Software associated with the icon receives the page-specific subjective user reaction to the particular web page as a whole for reporting to a website owner to allow the website owner to access page-specific subjective user reactions across the multiple particular web pages of the website to identify one or more particular web pages of the website for which the page-specific subjective user reactions are notable relative to page-specific subjective user reactions for other particular web pages of the website.

Particular embodiments of the present invention may provide one or more technical advantages. For example, particular embodiments may include a user reaction feedback mechanism. Particular embodiments may allow for consistent collection of user-response data. In particular embodiments, user-response data may be organized on a page-by-page basis and at an aggregate level through an on-line, self-serve, navigation system linking user feedback to site topography. In particular embodiments, demographic data for a user may be collected and associated with the user.

Particular embodiments may include an icon placed in a specific viewable location on each web page relative to the web browser border. In particular embodiments, the icon may be configured to remain in the viewable location relative to the browser border even as the user scrolls through the web page. In particular embodiments, the user feedback mechanism may be easy-to-use, fast, predictable, and consistent across pages and across sites to encourage usage. In particular embodiments, the user feedback mechanism may also be placed in the "masthead" area of a site and thus may be viewable from every page.

In particular embodiments, the website response measurement tool may include a user registration system for collecting user demographics information. In particular embodiments, collected user demographics information may be associated with user response data.

In particular embodiments, a self-serve online report may be generated. In particular embodiments, such a report may allow website owners to navigate through their website following the linked topography of the website to view the user response data. In particular embodiments, such a report may provide a number of display pages for displaying the user response data on a page-by-page basis with each of the display pages which may include user response data for a corresponding web page along with links to each of the pages linked from this page.

In particular embodiments, user reaction data may be quantified into a standardized measure.

Certain embodiments may provide all, some, or none of these technical advantages, and certain embodiments may provide one or more other technical advantages which may be readily apparent to those skilled in the art from the figures, descriptions, and claims included herein.

DESCRIPTION OF EXAMPLE EMBODIMENTS

Figure 1:
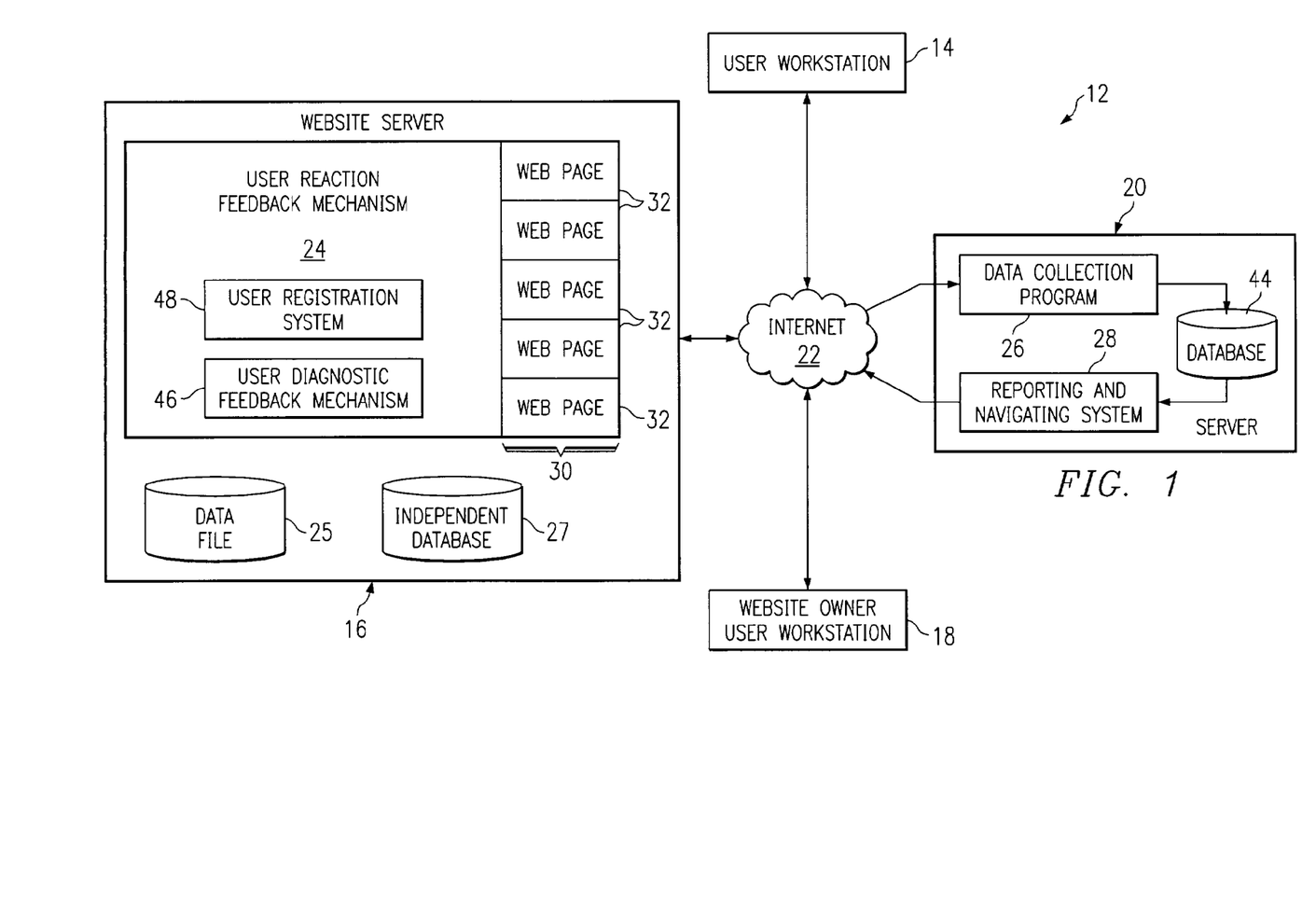
FIG. 1 illustrates an example system for measuring a page-specific subjective user reaction concerning each of multiple web pages of a website.

FIG. 1 illustrates an example system for measuring a page-specific subjective user reaction concerning each of multiple web pages of a website. Website response measurement tool 10 may be configured to operate on web page in a computer network 12, such as an intranet, extranet, or the Internet.

The website measurement tool 10 may, in particular embodiments, include a user reaction feedback mechanism 24, a data collection program 26 and a system for reporting and navigating the collected data 28. The user reaction feedback mechanism 24 may, in particular embodiments, reside on the website server 16 until a user requests the page. At this point, the user reaction feedback mechanism may be downloaded onto the user workstation 14 and, in particular embodiments, embedded in the user's browser. The data collection program 26 and system for reporting the collected data 28 may, in particular embodiments, reside on the data collection and reporting server 20.

The user reaction feedback mechanism 24 may be incorporated into certain web pages 32 residing on the website server 16. For example, the user reaction feedback mechanism 24 may include a client side script that may be activated when a web page 32 from the website 30 is accessed. In particular embodiments, the user reaction feedback mechanism 24 may include a Java-script computer program configured to run on the user workstation 14 when a user accesses a web page 32.

Figure 2:
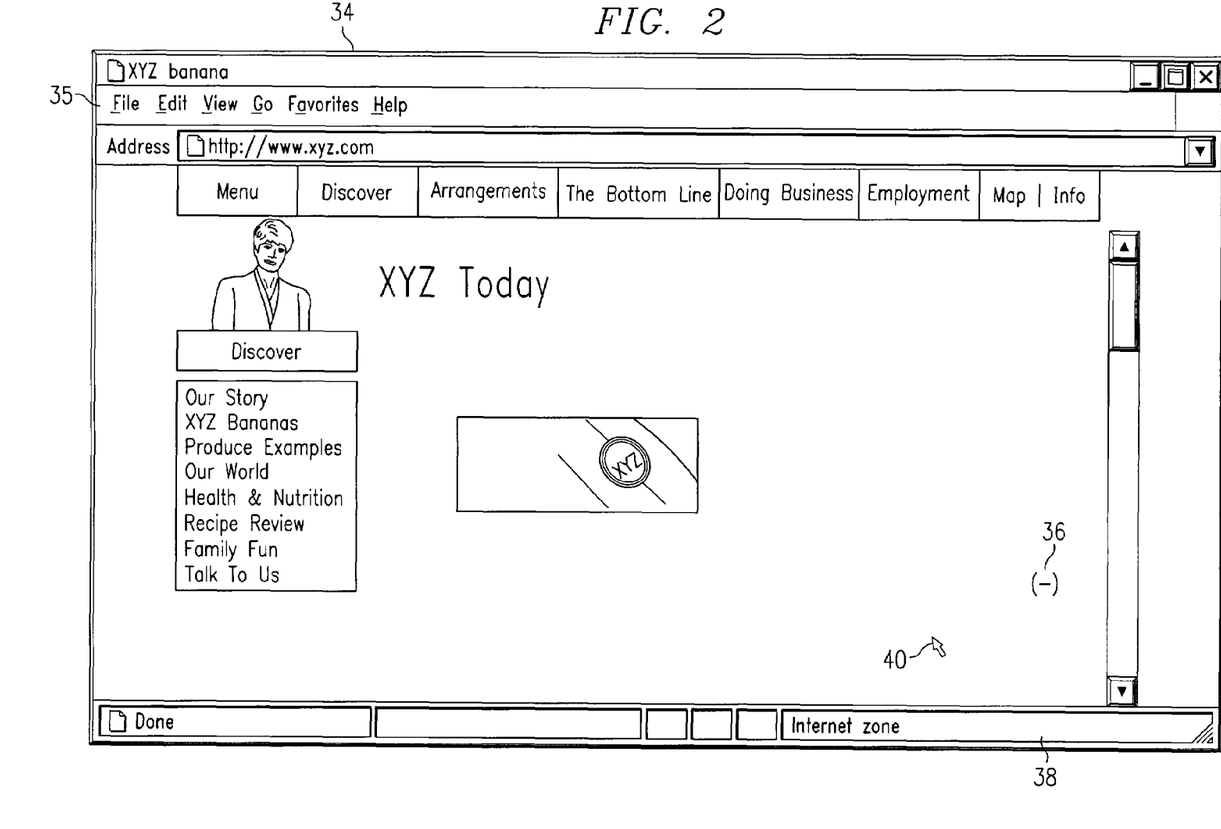
FIG. 2 illustrates an example web page including an example icon associated with an example user reaction measurement tool.

FIG. 2 illustrates an example web page including an example icon associated with an example user reaction measurement tool. A user may access a web page 32 residing on the website server 16 from the user workstation 14 via the Internet 22 using an Internet browser 34. Only a portion of the web page 32 may be viewable in the browser 34 window at a time. A user may scroll through the web page 32 changing the viewable portion.

In particular embodiments, the user reaction feedback mechanism 24 may appear as an icon 36 in a predetermined location relative to the browser window border 38 on the viewable portion of the web page 32. The icon 36 may be configured to remain in the predetermined location as the user scrolls through the web page 32. In addition or as an alternative, the icon 36 may be located in the masthead 35 area.

Figure 3:
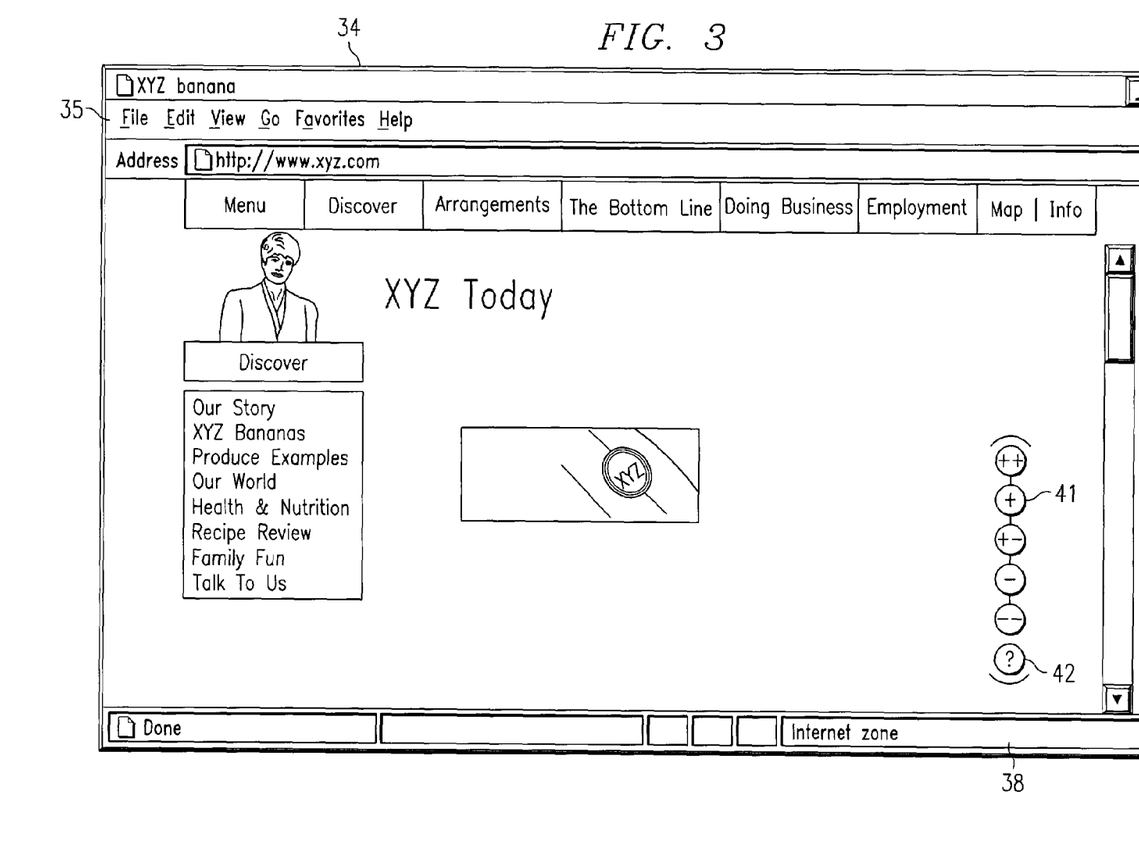
FIG. 3 illustrates an example web page including an example icon associated with a user reaction measurement tool including a five-point rating scale.

FIG. 3 illustrates an example web page including an example icon associated with a user reaction measurement tool including a five-point rating scale. As the user moves the mouse pointer 40 over the icon 36, the icon 36 may change into a five-point scale 41 and question mark 42. The user may rate his or her reaction to the web page 32 by selecting a rating from the five-point scale 41. The rating may, in particular embodiments, be selected by moving the mouse pointer 40 over the desired rating and clicking the mouse button (not shown). Selecting the question mark 42 may cause the user to be provided detailed instructions for using the measurement tool 10.

Upon selection of a rating by a user, the user reaction feedback mechanism 24 may, in particular embodiments, store the following information in a data file 25 on the data collection and reporting server 20:

page identification code;

Internet protocol address;

rating value (++, +, +/−, −, −−);

rating time and date;

time spent on page before rating it;

ID associated with the person rating the page (and desirably associated demographics); and     session ID.

In this way, user reaction data to a website 30 may be collected on a page-by-page basis providing definition and context to the data.

Figure 4:
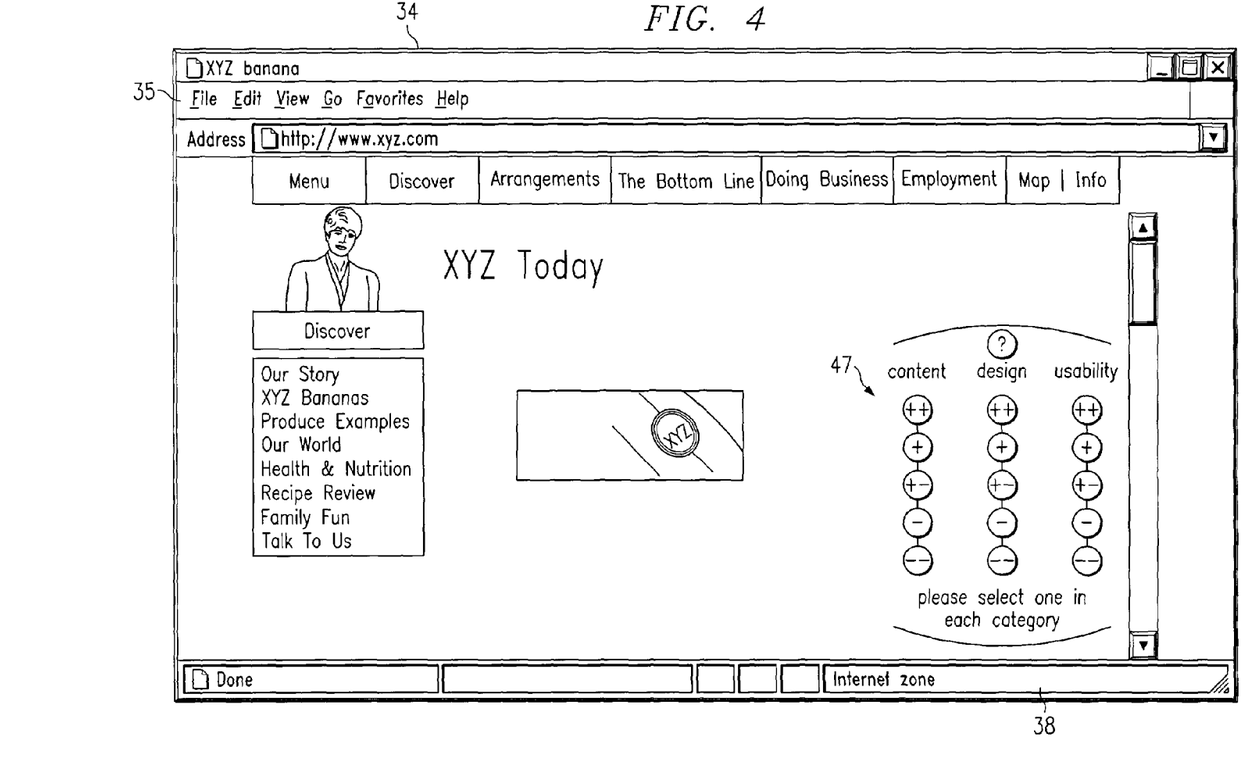
FIG. 4 illustrates an example web page including an example icon associated with a user reaction measurement tool including a series of three five-point rating scales.

FIG. 4 illustrates an example web page including an example icon associated with a user reaction measurement tool including a series of three five-point rating scales. The user reaction feedback mechanism 24 may, in particular embodiments, include a user diagnostic feedback mechanism 46. This icon 36 may be similar, but may be discriminated through color or other means from the single scale 41 measurement icon to maintain predictability and consistency from a user perspective. The user diagnostic feedback mechanism 46 may be configured to present a series of three scales 47 to the user designed to obtain the user's reaction to various specific aspects of the web page 32 such as content, design, and usability of the web page.

In this instance, the icon 36 may be configured to open to reveal three scales 47 of five points each, which may be similar to the previous single scale 41. The scales 47 may be labeled "Content," "Usability," and "Design." The scales 47 may be configured to rotate in position and may be opened to eliminate response bias.

The user's responses to each of the questions presented by the user diagnostic feedback mechanism 46, along with the information specified above, may in particular embodiments also be stored in the database 25 on the website server 16.

As with the user reaction feedback mechanism 24, the user diagnostic feedback mechanism 46 may collect user responses on a page-by-page basis. In this way, the website owner may use the data collected by the user diagnostic feedback mechanism 46 to identify specific aspects of a web page 32 that may be improved.

Figure 5:
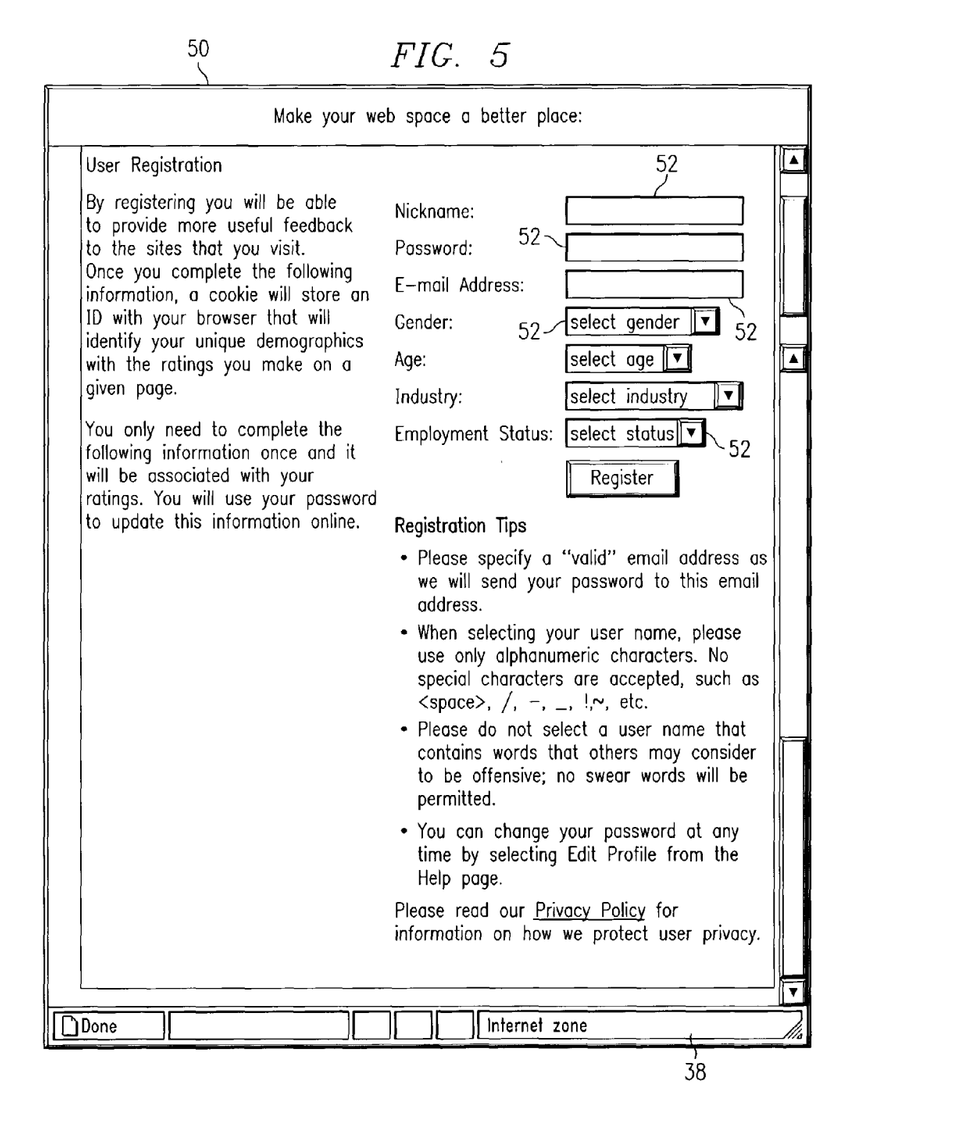
FIG. 5 illustrates an example user demographic information entry screen.

Additionally, a user registration system 48 may be included in the user reaction feedback mechanism 24 for collecting user demographic information. In particular embodiments, the user registration system 48 may be implemented as a web page registration page 50. As shown in FIG. 5, the web registration page 50 may, in particular embodiments, collect the following user information:

Nickname:
E-mail address (optional);
Password;
Gender;
Age (in ranges 10 or less, 11-17, 18-24, etc.);
Industry of user;
Employment (full-time, part-time, student, retired, etc.).

Additionally, the registration page 50 can collect the following information:

Size of household (1, 2, 3, 4, 4+);
Highest level of education;
Household income range;
Country of residence.

FIG. 5 illustrates an example user demographic information entry screen. The registration page 50 may include entry fields 52 into which the user may be prompted to enter the above demographic information. This demographic information may be used by the website owner to tailor their page revisions to appeal to a certain segment of users.

User demographic information may be stored in an independent database 27. Each user may be assigned a unique ID, preferably stored as a cookie on the user's workstation 14, which may be associated with their demographic profile. On subsequent use of the icon 36 by a registered user, the icon 36 may confirm that it recognizes the user by displaying their nickname and the word "thanks." The website response measurement tool 10 of the present invention may, in particular embodiments, be configured to allow a website owner to request reports showing user reaction to his or her website 30 on a page-by-page basis. The website owner may request a report by logging on to the data collection and reporting server 20 via the Internet 22 from the website owner's user workstation 18.

As an example only and not by way of limitation, when attempting to download the rating software onto a website, the website owner may be prompted by the data collection and reporting server 20 to enter the following information: First Name, Last Name, Title, Company, Address, E-mail Address, Phone Number, Industry, and website address. The data collection and reporting server 20 may, in particular embodiments, also send a notification that the website owner's website 30 may be crawled and a copy of a License Agreement regarding the providing of a report to the website owner.

Upon receiving the requested information from the website owner, the data collection and reporting server 20 may verify the user ID and password by E-mail via the Internet 22. The data collection and reporting server 20 may conduct a web crawl to identify all of the web pages associated with this website 30. This crawl may be repeated at a predetermined frequency, and may in particular embodiments also be triggered by receiving data about a web page 32. This information and site map may be collected and organized by the data collection program 26 and stored in a data base 44 on the data collection and reporting workstation 20.

All user reaction and demographic data and client registration data may be stored in the databases 25, 27 and 44. This information may be submitted via a secure socket layer (SSL) server. In particular embodiments, reports may generated on the fly from the databases 25, 27, and 44 by the data reporting system 28 on the data collection and reporting server 20. The website owner may be allowed to access to the data collection and reporting server 20 to view the graphical report 54 by using their user ID and password assigned.

Figure 6:
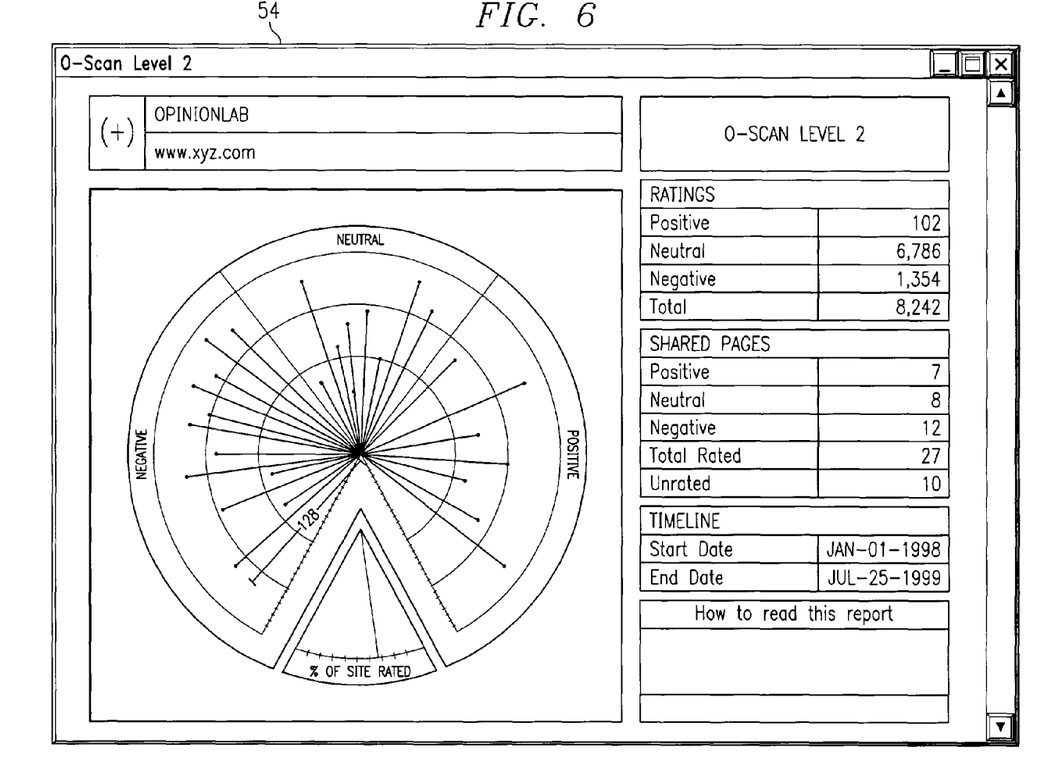
FIG. 6 illustrates an example topographical linked report.

Particular embodiments may provide for three ways to navigate to user response data for a specific page: (1) via a scan report categorizing average page ratings by color, value of the rating and number of ratings on a single graph; (2) by a list of pages; and (3) from the web page. FIG. 6 illustrates an example topographical linked report.

In particular embodiments, the data collection and reporting server 20 may be configured to provide an initial summary report including the user reaction data on a five-point scale on a page-by-page basis for free. The website server 20 may, in particular embodiments, also be configured to offer more detailed diagnostic reports including information collected by the user diagnostic feedback mechanism 46 and user demographic information collected by the user registration system 48 for a fee. Payment may be accepted by prepaid accounts, credit card submissions, telefaxed invoice, and possibly other means.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system comprising: an icon viewable on each of a plurality of web pages of a website, the icon being viewable independent of input from a user subsequent to the user accessing the web page, the icon soliciting a page-specific subjective user reaction to the web page as a whole from the user independent of input from the user subsequent to the user accessing the particular web page, the icon appearing identically and behaving consistently on each of the web pages, the icon comprising a multi-level rating scale for receiving a page-specific rating of the web page as a whole, the multi-level rating scale comprising at least one positive rating, a neutral rating, and at least one negative rating, each of the ratings comprising at least one symbol selected from the group consisting of a plus sign and a minus sign; and software associated with the icon and operable to: receive the page-specific subjective user reaction to the web page as a whole; cause the icon to become unviewable in response to the page-specific subjective user reaction to the web page and to remain unviewable while the user remains on the web page; access an identifier of the web page among the web pages of the website; and report to a website owner the page-specific subjective user reaction to the web page as a whole along with the identifier of the web page, the report and the identical appearance and consistent behavior of the icon on each of the web pages providing at least in part a direct comparison of the web page as a whole with one or more other web pages of the website each as a whole, the comparison identifying at least in part particular ones of the web pages of the website that are notable relative to other particular web pages of the website with respect to their page-specific subjective user reactions.

2. The system of claim 1, wherein the web page is not viewable in its entirety within a browser window of the user and the icon remains viewable in the browser window in response to the user scrolling to a previously unviewable portion of the web page.

3. The system of claim 2, wherein the icon remains in a substantially similar location with respect to the browser window of the user in response to the user scrolling to the previously unviewable portion of the web page.

4. The system of claim 1, wherein the software associated with the icon is incorporated into software of each web page and the user need not download software separate from the web page to provide the page-specific subjective user reaction to the web page.

5. The system of claim 1, wherein the software associated with the icon is incorporated into a web browser of the user.

6. The system of claim 1, wherein the page-specific subjective user reaction to the web page as a whole comprises:
a general page-specific user reaction to the web page as a whole; or
a specific page-specific user reaction to at least one characteristic of the web page as a whole.

7. The system of claim 5, wherein the characteristic of the web page as a whole comprises content, design, or usability.

8. The system of claim 1, wherein the software associated with the icon is operable to receive demographic information from the user, in response to the page-specific subjective user reaction to the web page as a whole, for reporting to the website owner in association with the page-specific subjective user reaction to the web page as a whole.

9. The system of claim 1, wherein the icon is viewable on less than all the web pages of the website.

10. The system of claim 1, further comprising a computer system operable to display the web page to the user.

11. One or more non-transitory computer-readable storage media embodying software when executed operable to: make an icon viewable on each of a plurality of web pages of a website, the icon being viewable independent of input from a user subsequent to the user accessing the web page, the icon soliciting a page-specific subjective user reaction to the web page as a whole from the user independent of input from the user subsequent to the user accessing the particular web page, the icon appearing identically and behaving consistently on each of the web pages, the icon comprising a multi-level rating scale for receiving a page-specific rating of the web page as a whole, the multi-level rating scale comprising at least one positive rating, a neutral rating, and at least one negative rating, each of the ratings comprising at least one symbol selected from the group consisting of a plus sign and a minus sign; receive the page-specific subjective user reaction to the web page as a whole; cause the icon to become unviewable in response to the page-specific subjective user reaction to the web page and to remain unviewable while the user remains on the web page; access an identifier of the web page among the web pages of the website; and report to a website owner the page-specific subjective user reaction to the web page as a whole along with the identifier of the web page, the report and the identical appearance and consistent behavior of the icon on each of the web pages providing at least in part a direct comparison of the web page as a whole with one or more other web pages of the website each as a whole, the comparison identifying at least in part particular ones of the web pages of the website that are notable relative to other particular web pages of the website with respect to their page-specific subjective user reactions.

12. The media of claim 11, wherein the web page is not viewable in its entirety within a browser window of the user and the icon remains viewable in the browser window in response to the user scrolling to a previously unviewable portion of the web page.

13. The media of claim 12, wherein the icon remains in a substantially similar location with respect to the browser window of the user in response to the user scrolling to the previously unviewable portion of the web page.

14. The media of claim 11, wherein the software is incorporated into each web page and the user need not download software separate from the web page to provide the page-specific subjective user reaction to the web page.

15. The media of claim 11, wherein the software is incorporated into a web browser of the user.

16. The media of claim 11, wherein the page-specific subjective user reaction to the web page as a whole comprises:
a general page-specific user reaction to the web page as a whole; or
a specific page-specific user reaction to at least one characteristic of the web page as a whole.

17. The media of claim 16, wherein the characteristic of the web page as a whole comprises content, design, or usability.

18. The media of claim 11, wherein the software is operable to receive demographic information from the user, in response to the page-specific subjective user reaction to the web page as a whole, for reporting to the website owner in association with the page- specific subjective user reaction to the web page as a whole.

19. The media of claim 11, wherein the icon is viewable on less than all the web pages of the website.

20. The media of claim 11, residing at a computer system operable to display the web page to the user.

21. A method comprising: making an icon viewable on each of a plurality of web pages of a website, the icon being viewable independent of input from a user subsequent to the user accessing the web page, the icon soliciting a page-specific subjective user reaction to the web page as a whole from the user independent of input from the user subsequent to the user accessing the particular web page, the icon appearing identically and behaving consistently on each of the web pages, the icon comprising a multi-level rating scale for receiving a page-specific rating of the web page as a whole, the multi-level rating scale comprising at least one positive rating, a neutral rating, and at least one negative rating, each of the ratings comprising at least one symbol selected from the group consisting of a plus sign and a minus sign; receiving the page-specific subjective user reaction to the web page as a whole; causing the icon to become unviewable in response to the page-specific subjective user reaction to the web page and to remain unviewable while the user remains on the web page; accessing an identifier of the web page among the web pages of the website; and reporting to a website owner the page-specific subjective user reaction to the web page as a whole along with the identifier of the web page, the report and the identical appearance and consistent behavior of the icon on each of the web pages providing at least in part a direct comparison of the web page as a whole with one or more other web pages of the website each as a whole, the comparison identifying at least in part particular ones of the web pages of the website that are notable relative to other particular web pages of the website with respect to their page-specific subjective user reactions.

22. The method of claim 21, wherein the web page is not viewable in its entirety within a browser window of the user and the icon remains viewable in the browser window in response to the user scrolling to a previously unviewable portion of the web page.

23. The method of claim 22, wherein the icon remains in a substantially similar location with respect to the browser window of the user in response to the user scrolling to the previously unviewable portion of the web page.

24. The method of claim 21, wherein software operable to execute the method is incorporated into each web page and the user need not download software separate from the web page to provide the page-specific subjective user reaction to the web page.

25. The method of claim 21, wherein software operable to execute the method is incorporated into a web browser of the user.

26. The method of claim 21, wherein the page-specific subjective user reaction to the web page as a whole comprises:

a general page-specific user reaction to the web page as a whole; or a specific page-specific user reaction to at least one characteristic of the web page as a whole.

27. The method of claim 26, wherein the characteristic of the web page as a whole comprises content, design, or usability.

28. The method of claim 21, further comprising receiving demographic information from the user, in response to the page-specific subjective user reaction to the web page as a whole, for reporting to the website owner in association with the page-specific subjective user reaction to the web page as a whole.

29. The method of claim 21, wherein the icon is viewable on less than all the web pages of the website.

30. The method of claim 21, executed at least in part by a computer system operable to display the web page to the user.

* * * * *